United States Patent
Rodgers et al.

(10) Patent No.: US 10,116,533 B1
(45) Date of Patent: Oct. 30, 2018

(54) METHOD AND SYSTEM FOR LOGGING EVENTS OF COMPUTING DEVICES

(71) Applicant: Skyport Systems, Inc., Mountain View, CA (US)

(72) Inventors: Robert Stephen Rodgers, Mountain View, CA (US); Thomas John Giuli, Mountain View, CA (US)

(73) Assignee: Skyport Systems, Inc., Mountain View, CA (US)

(*) Notice: Subject to any disclaimer, the term of this patent is extended or adjusted under 35 U.S.C. 154(b) by 188 days.

(21) Appl. No.: 15/054,749

(22) Filed: Feb. 26, 2016

(51) Int. Cl.
G06F 15/173 (2006.01)
H04L 12/26 (2006.01)
H04L 29/08 (2006.01)

(52) U.S. Cl.
CPC .......... *H04L 43/06* (2013.01); *H04L 67/2842* (2013.01)

(58) Field of Classification Search
CPC ............. H04L 63/0823; H04L 63/0876; H04L 67/2842; H04L 67/22; H04L 9/3231
USPC .................................. 709/223, 224
See application file for complete search history.

(56) References Cited

U.S. PATENT DOCUMENTS

| | | |
|---|---|---|
| 7,870,153 B2 | 1/2011 | Croft et al. |
| 7,886,023 B1 | 2/2011 | Johnson |
| 8,010,679 B2 | 8/2011 | Low et al. |
| 8,051,180 B2 | 11/2011 | Mazzaferri et al. |
| 8,166,261 B1 | 4/2012 | Cremelie et al. |
| 8,218,828 B2 | 7/2012 | Iasso |
| 8,438,654 B1 | 5/2013 | von Eicken et al. |
| 8,572,400 B2 | 10/2013 | Lin et al. |
| 8,588,233 B1 | 11/2013 | Lohner et al. |
| 8,607,054 B2 | 12/2013 | Ramarathinam et al. |
| 8,661,252 B2 | 2/2014 | Chandwani |
| 8,959,108 B2 | 2/2015 | Pereira et al. |
| 9,495,379 B2 | 11/2016 | Zhang et al. |
| 2003/0212779 A1 | 11/2003 | Boyter et al. |
| 2007/0107046 A1 | 5/2007 | Jaeger et al. |
| 2007/0233698 A1 | 10/2007 | Sundar et al. |
| 2009/0063538 A1 | 3/2009 | Chitrapura et al. |
| 2009/0248786 A1 | 10/2009 | Richardson et al. |
| 2010/0058468 A1 | 3/2010 | Green et al. |
| 2010/0088367 A1 | 4/2010 | Brown et al. |
| 2010/0088405 A1 | 4/2010 | Huang et al. |
| 2011/0072505 A1 | 3/2011 | Ott |
| 2011/0162042 A1 | 6/2011 | Xiao et al. |

(Continued)

OTHER PUBLICATIONS

Office Action issued in related U.S. Appl. No. 14/705,589, dated Dec. 29, 2016 (29 pages).

*Primary Examiner* — Wing F Chan
*Assistant Examiner* — Andrew Woo
(74) *Attorney, Agent, or Firm* — Osha Liang LLP

(57) ABSTRACT

A method for logging events of computing devices. The method includes receiving, by a management service, a log event message from a computing device. The log event message includes a log event associated fingerprint. The method further includes reconstructing, by the management service, an object corresponding to the log event associated fingerprint and reconstructing, by the management service, at least one parent object of the object corresponding to the log event associated fingerprint. The method also includes gathering, by the management service, configuration information from the object corresponding to the log event associated fingerprint, and from the at least one parent object.

14 Claims, 13 Drawing Sheets

(56) References Cited

U.S. PATENT DOCUMENTS

| | | |
|---|---|---|
| 2012/0066582 A1 | 3/2012 | Scoda et al. |
| 2012/0151209 A1 | 6/2012 | Visnyak et al. |
| 2013/0185715 A1 | 7/2013 | Dunning et al. |
| 2013/0205376 A1 | 8/2013 | Narasimha et al. |
| 2013/0238808 A1 | 9/2013 | Hallem et al. |
| 2014/0101113 A1* | 4/2014 | Zhang ................ G06F 11/1453 707/692 |
| 2014/0165147 A1 | 6/2014 | Hershberg et al. |
| 2014/0189808 A1 | 7/2014 | Mahaffey et al. |
| 2014/0281500 A1 | 9/2014 | Ignatchenko |
| 2014/0297779 A1 | 10/2014 | Pack et al. |
| 2014/0344475 A1 | 11/2014 | Chen et al. |
| 2015/0007250 A1 | 1/2015 | Dicato, Jr. et al. |
| 2015/0100887 A1* | 4/2015 | Verkasalo ............. G06F 3/0482 715/735 |
| 2015/0161282 A1 | 6/2015 | Low et al. |
| 2015/0215308 A1 | 7/2015 | Manolov et al. |
| 2015/0254451 A1 | 9/2015 | Doane et al. |
| 2016/0004859 A1 | 1/2016 | Goodes et al. |
| 2016/0021055 A1 | 1/2016 | Krzywonos et al. |
| 2016/0119365 A1 | 4/2016 | Barel |
| 2016/0127407 A1 | 5/2016 | Mankovskii et al. |

\* cited by examiner

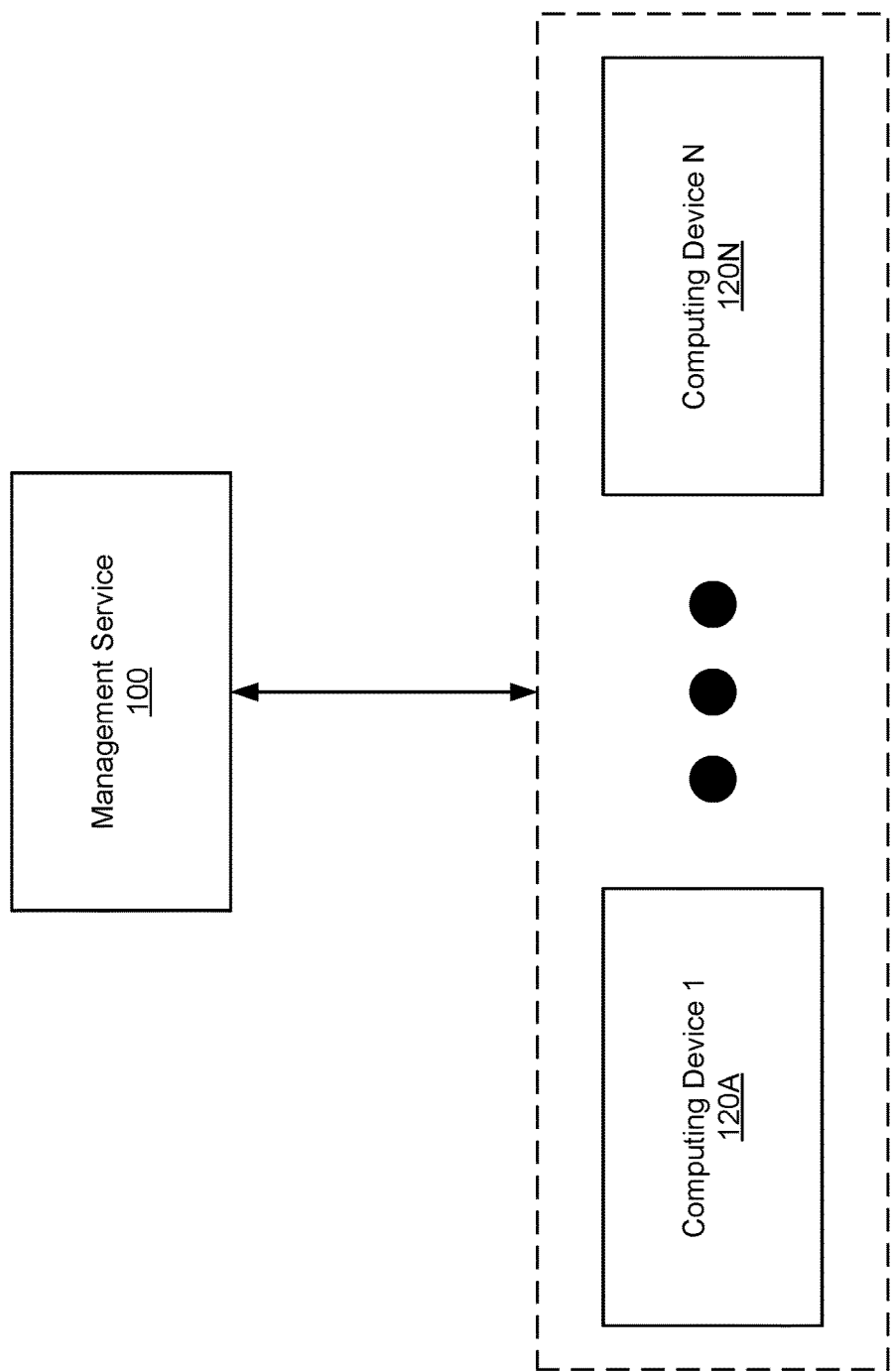

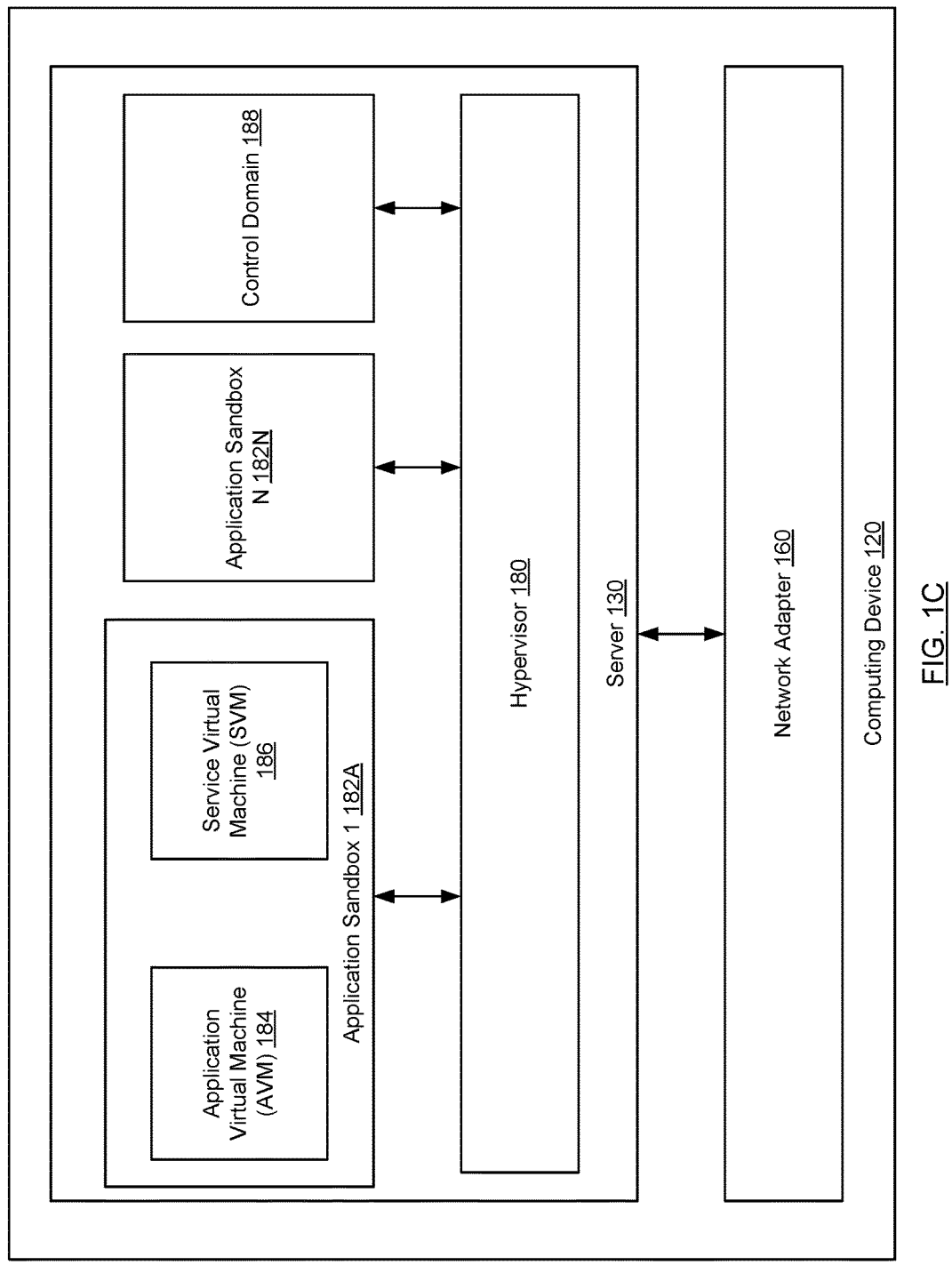

Log Event Message 904 sender_name: "lumberyard.0"
sender_seq: 12481
at: 14218951485373224982
expires: 14218952085373323172
context: 12481
reptop: "lumberyard"
reppart: 0
dockmeta {
  cloudDockId: "SPVM-Q7ENAPFJR6"
  at: 14218951472277404795
  context: 0
  subsystemSerialId: "CPVM-5219046"
}
dat {
  type: APMDATA
  apmdata {
    format: APM_FC_FLOW_DATA
    fcflowdata {
      common_data {
        time_of_event: 14218951466117119762
        entitlement_fps: "008--net_addr_cdcfg--external_outbound_addr01--ptf-SPVM-Q7ENAPFJR6___allow-origin-3---  ← Log Event Associated Fingerprint 908.1
           9df75ae6fb5a8e174dab3f6214fbdb07978388c482d89a4c96490378cfc3079d"
        app_fingerprint: "005---instance_cdcfg--ptf-SPVM-Q7ENAPFJR6--  ← Log Event Associated Fingerprint 908.2
           6021073606bdbb0f00d4cf97c246c797a868d33782a329877297345d0337e36"
      }
      new_flows: 1
    }
  }
}

⎫
⎬ Log Event Content 906
⎭

FIG. 9A

Log Event Associated Fingerprint 908.2
005--instance_cdcfg--ptf-SPVM-Q7ENAPFJR6--
60210736c6bdbb0f00d4cf97c246c797a868d33
782a32987f27973450d337e36"

Reconstructed Object 936.5
fp: "005--instance_cdcfg--ptf-SPVM-Q7ENAPFJR6--60210736c6bdbb0f00d4cf97c246c797a868d33782a32987f27973450d337e36"
type: "InstanceCdcfg"
name: "ptf-SPVM-Q7ENAPFJR6"
objectIdInt: 1029
revisionId: 30
provRev: 1
internal: true
appType: "test-flight"
enterpriseId: "SPE-5468652041"

FIG. 9C

METHOD AND SYSTEM FOR LOGGING EVENTS OF COMPUTING DEVICES

BACKGROUND

Computing devices may require logging of events, including, for example, the configuration state of the computing device, error messages, status messages, etc., to monitor performance, compliance, potential threats, etc.

SUMMARY

In general, in one aspect, the invention relates to a method for logging events of computing devices. The method includes receiving, by a management service, a log event message from a computing device. The log event message includes a log event associated fingerprint. The method further includes reconstructing, by the management service, an object corresponding to the log event associated fingerprint and reconstructing, by the management service, at least one parent object of the object corresponding to the log event associated fingerprint. The method also includes gathering, by the management service, configuration information from the object corresponding to the log event associated fingerprint, and from the at least one parent object.

In general, in one aspect, the invention relates to a non-transitory computer readable medium comprising computer readable program code, which when executed by a computer processor enables the computer processor to receive a log event message from a computing device. The log event message includes a log event associated fingerprint. The computer readable program code further enable the computer processor to reconstruct an object corresponding to the log event associated fingerprint, to reconstruct at least one parent object of the object corresponding to the log event associated fingerprint; and to gather configuration information from the object corresponding to the log event associated fingerprint, and from the at least one parent object.

In general, in one aspect, the invention relates to a computing device. The computing device includes a server including a processor and a non-transitory computer readable medium including computer readable program code implementing a management service, which when executed by the processor enables the server to receive, by the management service, a log event message from a computing device. The log event message comprises a log event associated fingerprint. The computer readable program code implementing the management service further enables the server to reconstruct, by the management service, an object corresponding to the log event associated fingerprint, to reconstruct, by the management service, at least one parent object of the object corresponding to the log event associated fingerprint, and to gather, by the management service, configuration information from the object corresponding to the log event associated fingerprint, and from the at least one parent object.

Other aspects of the invention will be apparent from the following description and the appended claims.

BRIEF DESCRIPTION OF DRAWINGS

FIGS. 1A-1C show systems in accordance with one or more embodiments of the invention.

FIGS. 9A-9C show a use case scenario in accordance with one or more embodiments of the invention.

DETAILED DESCRIPTION

Specific embodiments of the invention will now be described in detail with reference to the accompanying figures. In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In the following description of FIGS. 1A-9C, any component described with regard to a figure, in various embodiments of the invention, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments of the invention, any description of the components of a figure is to be interpreted as an optional embodiment, which may be implemented in addition to, in conjunction with, or in place of the embodiments described with regard to a corresponding like-named component in any other figure.

In general, embodiments of the invention relate to logging events detected on computing devices. More specifically, embodiments of the invention relate to remotely logging the events detected on the computing devices, by a management service. In one embodiment of the invention, a computing device sends a log event message to the management service when an event occurs. The management service may receive the log event message and may reconstruct the configuration state of the computing device from the log event, i.e., the management service may reconstruct configuration information beyond the information available from the log event message itself. Reconstruction of the configuration state may enable the assessment of not only the log event itself, but also of the configuration of other elements of the computing device that, directly or indirectly, may have led to or may have contributed to the generation of the log event.

Figure 1B:
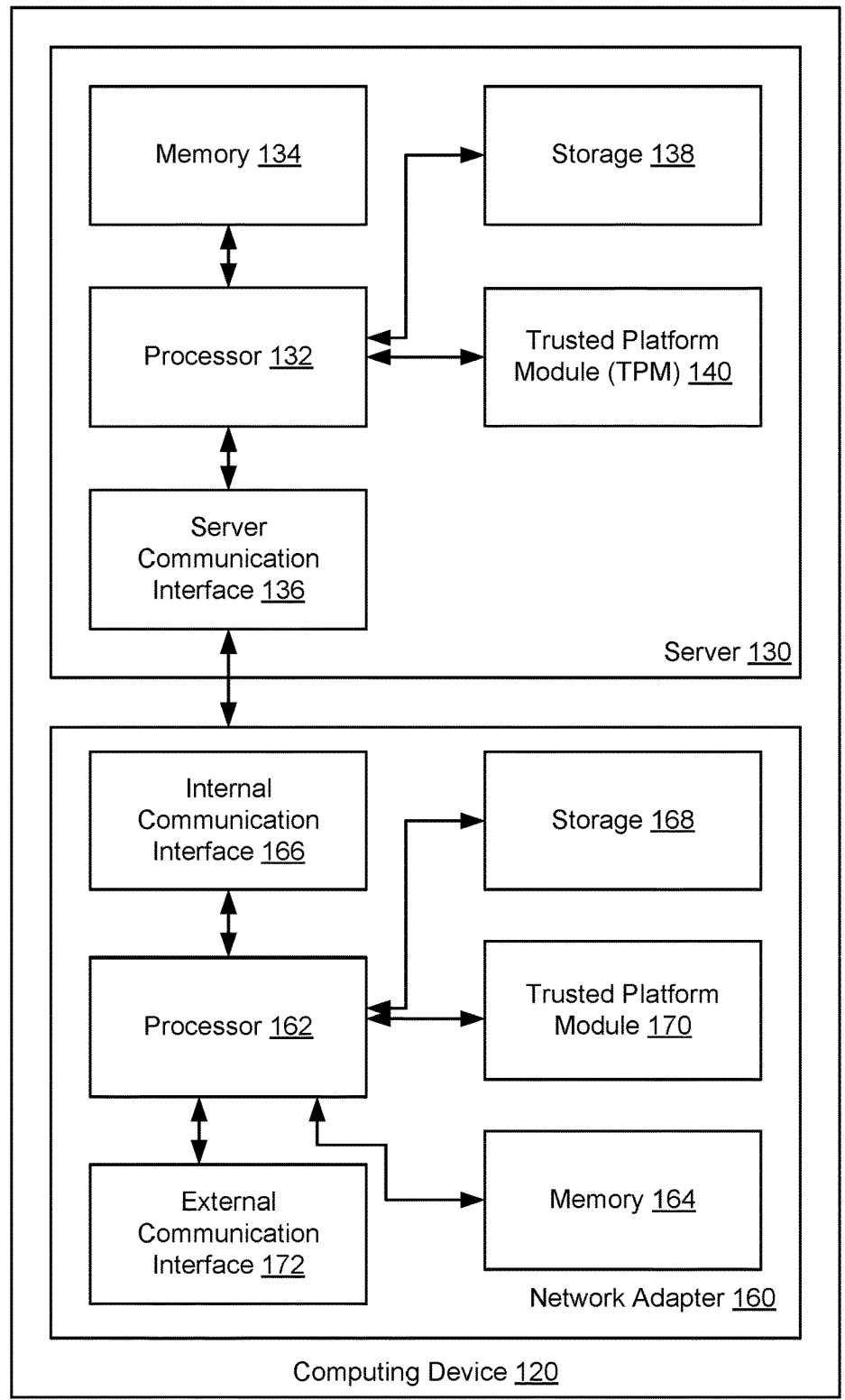

FIG. 1A shows a system in accordance with one or more embodiments of the invention. The system includes computing devices (120A-120N) (described, e.g., in FIGS. 1B-1C) operatively connected to a management service (100). In one embodiment of the invention, the management service (100) is any combination of hardware and software that includes functionality to manage one or more computing devices. More specifically, the management service (100) may include one or more servers (each including at least a processor, memory, persistent storage, and a communication interface) executing one or more applications (not shown) that include functionality to manage the computing devices (120A, 120N). The management of the computing devices by the management service may include, but is not limited to, functionality to: configure the computing device, modify the configuration (or operation of) the computing device, verify the integrity of the computing devices (i.e., to determine whether there has been any tampering (of the software and/or hardware) of the computing device), receive data from and/or provide data to the computing devices, provide applications to the computing device, and provide functionality to implement various methods described below (see e.g., FIGS. 7 and 8).

The management service may communicate with the computing device(s) using any combination of wired and/or wireless communication protocols. Further, the management service may communicate with the management service via a local area network (e.g., an enterprise network, and/or wide area network (e.g., over the Internet)). The communication between the management service and the computing devices may include any combination of secured (e.g., encrypted) and non-secure (e.g., un-encrypted) communication channels. In one or more embodiments of the invention, secure communication is ensured, even in case of a non-secure communication channel. The manner in which the management service and the computing devices communicate may vary based on the implementation of the invention.

In one embodiment of the invention, the computing devices (120A, 120N) may be located within an enterprise. More specifically, the computing devices may be on an enterprise network (i.e., behind the enterprise's firewall).

The management service and one or more of the computing devices may be located in the same physical location (e.g., in the same data center). Alternatively, the management service and one or more of the computing devices may be located in different physical locations. The physical locations of the management service and the computing devices may vary based on the implementation.

As discussed above, the management service includes functionality to verify the integrity of the computing devices. The aforementioned verification may be performed whenever the computing device is powered on, restarted, etc. and at any other point at which the management service determines it is necessary (e.g., based on a policy implemented by the management service) to verify the integrity of the computing device.

The following is an example of the integrity verification performed by the management service when a computing device is powered on. The example is not intended to limit the invention. Turning to the example, consider a scenario in which a computing device is configured and then subsequently shipped to a user to be installed into their enterprise network. Once the computing device has been installed in the enterprise network, the computing device is powered on and the integrity verification for the computing device is initiated. In this example, through the integrity verification processes, the computing device needs to provide to the management service serial numbers (or other identification numbers) for one or more hardware components (see e.g., FIG. 1B) in the computing device) and perform a series of integrity measurements of the software that is present on the computing device (e.g., the BIOS, executable code in the ROM, platform and motherboard configuration data, operating system software, virtualization software, applications, etc.). In one embodiment of the invention, each of the integrity measurements is a cryptographic hash (e.g., SHA-256 hash) of the software being measured. The integrity measurements may be obtained in accordance with one or more Trusted Computing Group Trusted Platform Module specifications. Other methods for performing integrity measurements may be implemented without departing from the invention.

Returning to the example, once the serial numbers and the integrity measurements are provided to the management service, the management service verifies the aforementioned information. If the verification is successful, then the integrity of the computing device has been verified. At this point, the management service may permit the computing device to complete the boot process. More specifically, in one embodiment of the invention, the computing device's functionality may be limited until its integrity has been successfully verified. Accordingly, prior to successful verification, the computing device may only perform the functions that are required to enable its integrity verification. All other functionality may be disabled, e.g., the computing device cannot execute any other operating system or applications, the computing device cannot communicate with any other remote system except the management service, etc.

Continuing with the discussion of FIG. 1A, in one embodiment of the invention, each of the computing devices includes functionality to execute one or more applications (discussed below, see e.g., FIG. 1C). Further, each of the computing devices may include functionality to interact with other computing devices, the management service, and/or other systems (i.e., systems that are operatively connected to the computing device).

FIG. 1B shows a system in accordance with one or more embodiments of the invention. In one or more embodiments of the invention, computing device (120) includes two components: a server (130) and a network adapter (160). Each of these components is described below.

In one embodiment of the invention, the server (130) may include functionality to execute applications, virtual machines, and one or more operating systems (see e.g., FIG. 1C). The server (130) may include a processor (132), memory (134), a server communication interface (136), storage (138), and a trusted platform module (140). Each of these components is described below.

In one embodiment of the invention, the processor (132) is a group of electronic circuits with a single core or multi-cores that are configured to execute instructions. In one embodiment of the invention, the processor may be implemented using a Complex Instruction Set (CISC) Architecture or a Reduced Instruction Set (RISC) Architecture In one embodiment of the invention, the memory (134) corresponds to any volatile memory including, but not limited to, Dynamic Random-Access Memory (DRAM), Synchronous DRAM, SDR SDRAM, and DDR SDRAM.

In one embodiment of the invention, the server communication interface (136) enables communication between the server (130) and the network adapter (160). The server communication interface may provide the only path through which the server and the network adapter may communicate. Accordingly, the server may not directly access any other component of the network adapter (160). The server communication interface (136) may use any of the following protocols to communicate with the network adapter: Peripheral Component Interconnect (PCI), PCI-Express (PCIe), and PCI-eXtended (PCI-X), Non-Volatile Memory Express (NVMe). Those skilled in the art will appreciate that the invention is not limited to the aforementioned protocols.

In one embodiment of the invention, the storage (138) corresponds to any persistent (non-volatile storage). The storage (138) may include any combination of the following: magnetic storage, optical storage, NAND Flash memory, NOR Flash memory, Magnetic RAM Memory (M-RAM), Spin Torque Magnetic RAM Memory (ST-MRAM), Phase Change Memory (PCM), memristive memory, or any other memory defined as a non-volatile Storage Class Memory (SCM). Those skilled in the art will appreciate that embodiments of the invention are not limited to aforementioned types of storage.

In one embodiment of the invention, the trusted platform module (140) (which may also be referred to as hardware security module) is a microprocessor that includes a cryptographic processor, a secure input/output (IO) interface, persistent memory (which may store various cryptographic keys), and volatile memory (which may store integrity measurements and cryptographic keys). In one embodiment of the invention, the cryptographic processor may include functionality to encrypt and decrypt data, generate random numbers, generate cryptographic keys (e.g., public-private key pairs, symmetric keys, etc.), and generate hash values (e.g., using SHA-256). The trusted platform module may be implemented in a manner that conforms to one or more Trusted Computing Group Trusted Platform Module specifications.

In one embodiment of the invention, the network adapter (160) includes functionality to control and/or provide network access between the server and other entities that are external to the computing device (e.g., other computing devices, the management services, and other systems (described above)). The network adapter may also include functionality to control the server's hardware resets and boot behavior. The network adapter (160) may include a processor (162), memory (164), an internal communication interface (166), storage (168), a trusted platform module (170), and an external communication interface (172). Each of these components is described below.

In one embodiment of the invention, the processor (162) is a group of electronic circuits with a single core or multi-cores that are configured to execute instructions. In one embodiment of the invention, the processor may be implemented using a Complex Instruction Set (CISC) Architecture or a Reduced Instruction Set (RISC) Architecture In one embodiment of the invention, the memory (164) corresponds any volatile memory including, but not limited to, Dynamic Random-Access Memory (DRAM), Synchronous DRAM, SDR SDRAM, and DDR SDRAM.

In one embodiment of the invention, the internal communication interface (166) enables communication between the server (130) and the network adapter (160). The internal communication interface may provide the only path through which the server and the network adapter may communicate. Accordingly, all communication from the server (130) and to the server (130) passes through the internal communication interface (166) The internal communication interface (166) may use any of the following protocols to communicate with the network adapter: Peripheral Component Interconnect (PCI), PCI-Express (PCIe), and PCI-eXtended (PCI-X), Non-Volatile Memory Express (NVMe). Those skilled in the art will appreciate that the invention is not limited to the aforementioned protocols.

In one embodiment of the invention, the storage (168) corresponds to any persistent (non-volatile storage). The storage (168) may include any combination of the following: magnetic storage, optical storage, NAND Flash memory, NOR Flash memory, Magnetic RAM Memory (M-RAM), Spin Torque Magnetic RAM Memory (ST-MRAM), Phase Change Memory (PCM), memristive memory, or any other memory defined as a non-volatile Storage Class Memory (SCM). Those skilled in the art will appreciate that embodiments of the invention are not limited to aforementioned types of storage.

In one embodiment of the invention, the trusted platform module (170) (which may also be referred to as hardware security module) is the same or substantially similar to the TPM (140) described above.

In one embodiment of the invention, the external communication interface (172) enables the computing device (120) to communicate with the management service, other computing devices, or other systems (described above). The external communication interface may be implemented in accordance with the Ethernet standard (i.e., the external communication interface may include one or more Ethernet ports). Other communication standards may be used without departing from the invention.

In one embodiment of the invention, the network adapter (160) may include functionality to implement various secure communication protocols such as Internet Protocol Security (IPSec), Secure Sockets Layer (SSL), and Transport Layer Security (TLS). Further, the network adapter (160) may include functionality to perform various cryptographic functions on behalf of the server (or processes executing therein). For example, the network adapter (160) may include one or more FPGAs, one or more ASICs, etc. that that may be used to perform encryption and decryption functions on behalf of the processes executing in the server.

As discussed above, the computing devices include functionality to obtain integrity measurements that are used by the management service in order to verify the integrity of the computing device. In one embodiment of the invention, the server (using TPM (150)) and the network adapter (using TPM (170)) are each responsible for obtaining integrity measurements for the software executing therein. The management service, upon receiving the aforementioned measurements, may then verify the integrity of the server and network adapter independently. Further, the management service may only permit applications and virtual machines to execute on the computing devices if both the integrity of the server (130) and the integrity of the network adapter (160) have been verified. In certain scenarios, if the integrity of either the network adapter or the server cannot be verified, then the computing device may cease operating (or initiate some other remedial action).

In one embodiment of the invention, the network adapter may limit the server's use of the external communication interface (172) until the server's integrity has been verified. In such scenarios, the server (130) may only be able to access the management service via the external communication interface until the integrity of the server has been verified.

FIG. 1C shows a logical view of the computing device in accordance with one or more embodiments of invention. As shown in FIG. 1C and previously discussed, the computing device includes a server (130) and a network adapter (160). Further, the server (130) may have thereon one or more of the following components: a hypervisor (180), a control domain (188), and one or more application sandboxes (182A, 182N). Each of these components is described below.

In one embodiment of the invention, the control domain (188) is a virtual machine that includes an operating system (e.g., Security-Enhanced Linux). The control domain provides an isolated execution environment for processes/services executing within the control domain. The control domain (via the services executing therein) manages other virtual machines (discussed above) executing on the server (130). Management of the virtual machines may include, but is not limited to, instantiating virtual machines, halting execution of virtual machines on the server, providing various services to virtual machines (e.g., key management, backend processing of various protocol proxies executing in the service virtual machines (discussed below), etc.), and obtaining and enforcing policies related to the operation of the virtual machines in one or more application sandboxes.

In one embodiment of the invention, an application sandbox (182A, 182) includes one or more service virtual machines (SVM) (186) and one or more application virtual machines (AVMs) (184). Each of the SVMs and the AVMs is an isolated executing environment that includes its own operating system (e.g., Linux, Security-Enhanced Linux, or Windows). In embodiment of the invention, each AVM is associated with one SVM but each SVM may be associated with multiple AVMs. Each AVM includes functionality to execute one or more applications (including $3^{rd}$ applications). In party one embodiment of the invention, the applications and/or processes executing within the AVM are only able to directly communicate with the associated SVM. The SVM may, based on one or more policies, permit the applications and/or processes within the AVM to access resources (software resources and/or hardware resources) in the server and/or the network adapter. In other embodiments of the invention, certain applications and/or processes in the AVM may (in certain scenarios) directly access resources in the server and/or network adapter. In such cases, the system may implement a policy which dictates when the applications/processes in an AVM can directly access the resources in the server and/or the network adapter and when the applications/processes are required to communicate with the SVM, which in turn communicates with the resources on the server and/or network adapter.

Continuing with the discussion of FIG. 1C, the SVM includes functionality to provide various services to the associated AVMs. These services may include, but are not limited to, various network services such as DHCP, ARP, DNS, and various file system services (i.e., services to access data that is external to the AVM). The services provided by the SVM to the AVM may be implemented as proxy services within the SVM. More specifically, from the perspective of the AVM, the proxy services provided by the SVM are the actual services. However, the proxy services provided by the SVM may be modified versions of the actual services, where the modification to the actual services may include modifications that limit access to the actual services or change the behavior of the actual services. In one embodiment of the invention, the control domain may perform various levels of processing to assist the SVM in implementing one or more proxy services. For example, in certain scenarios the proxy service is completely implemented in the SVM while in other scenarios a portion of the proxy service is implemented in the SVM while another portion of the proxy service is implemented in the control domain.

In one embodiment of the invention, the hypervisor (180) provides the interface between the hardware resources on the server (see e.g., FIG. 1B) and the virtual machines (e.g., control domain, SVMs, AVMs, etc.) executing on the server. The hypervisor executing on the server (130) may be, for example, a Xen® hypervisor (the mark is a registered trademark of Citrix, Santa Clara, Calif.), a kernel-based virtual machine (KVM), vSphere ESXi® (the mark is a registered trademark of VMware, Palo Alto, Calif.), or Hyper-V® (the mark is a registered trademark of Microsoft, Redmond, Wash.).

Figure 2:
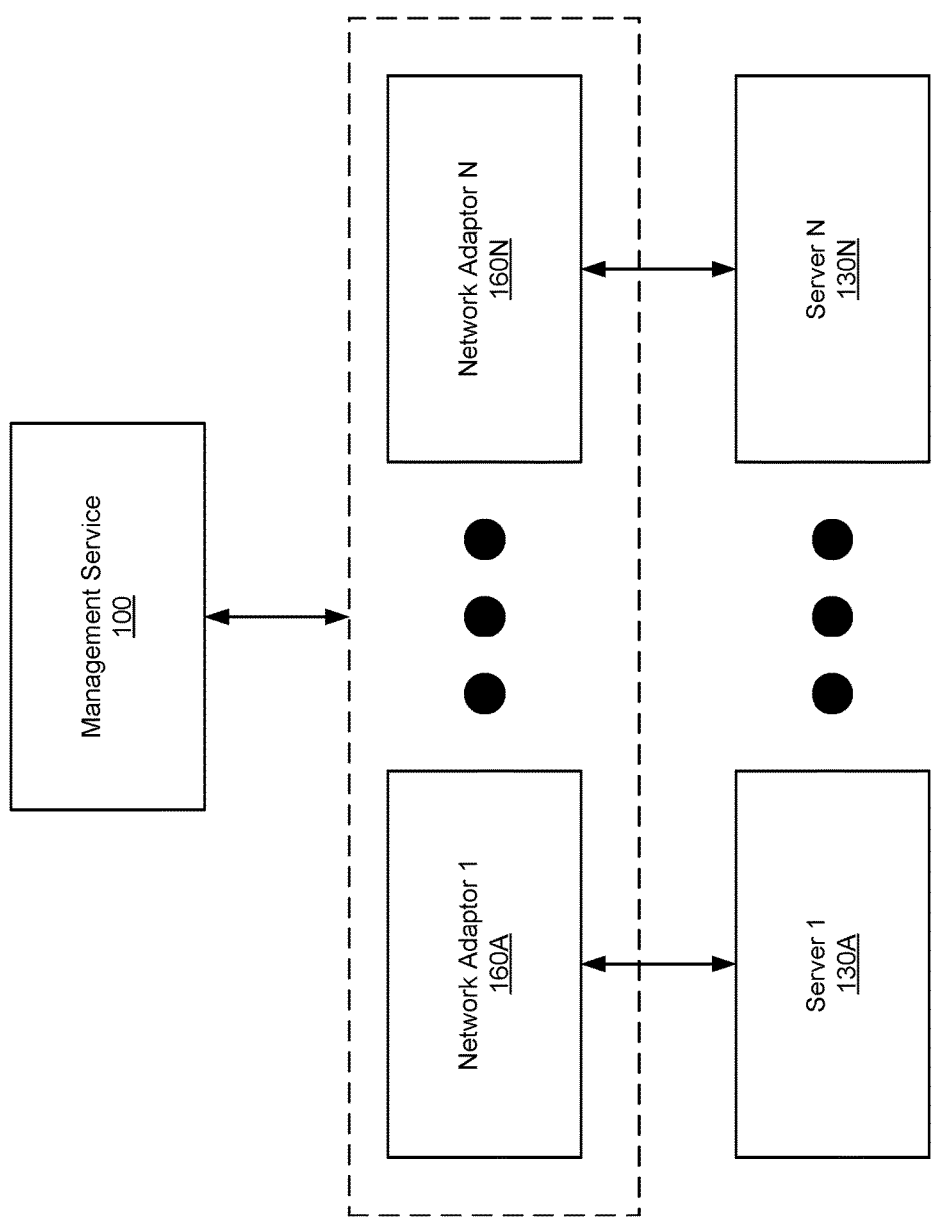
FIG. 2 shows a system in accordance with one or more embodiments of the invention.

FIG. 2 shows an alternate configuration of the system in accordance with one or more embodiments of the invention. In the system shown in FIG. 2, the servers (130A, 130B) and the network adapters (160A, 160B) are physically separate components as opposed to two components located within a single physical system (i.e., in computing device (120)).

Figure 3:
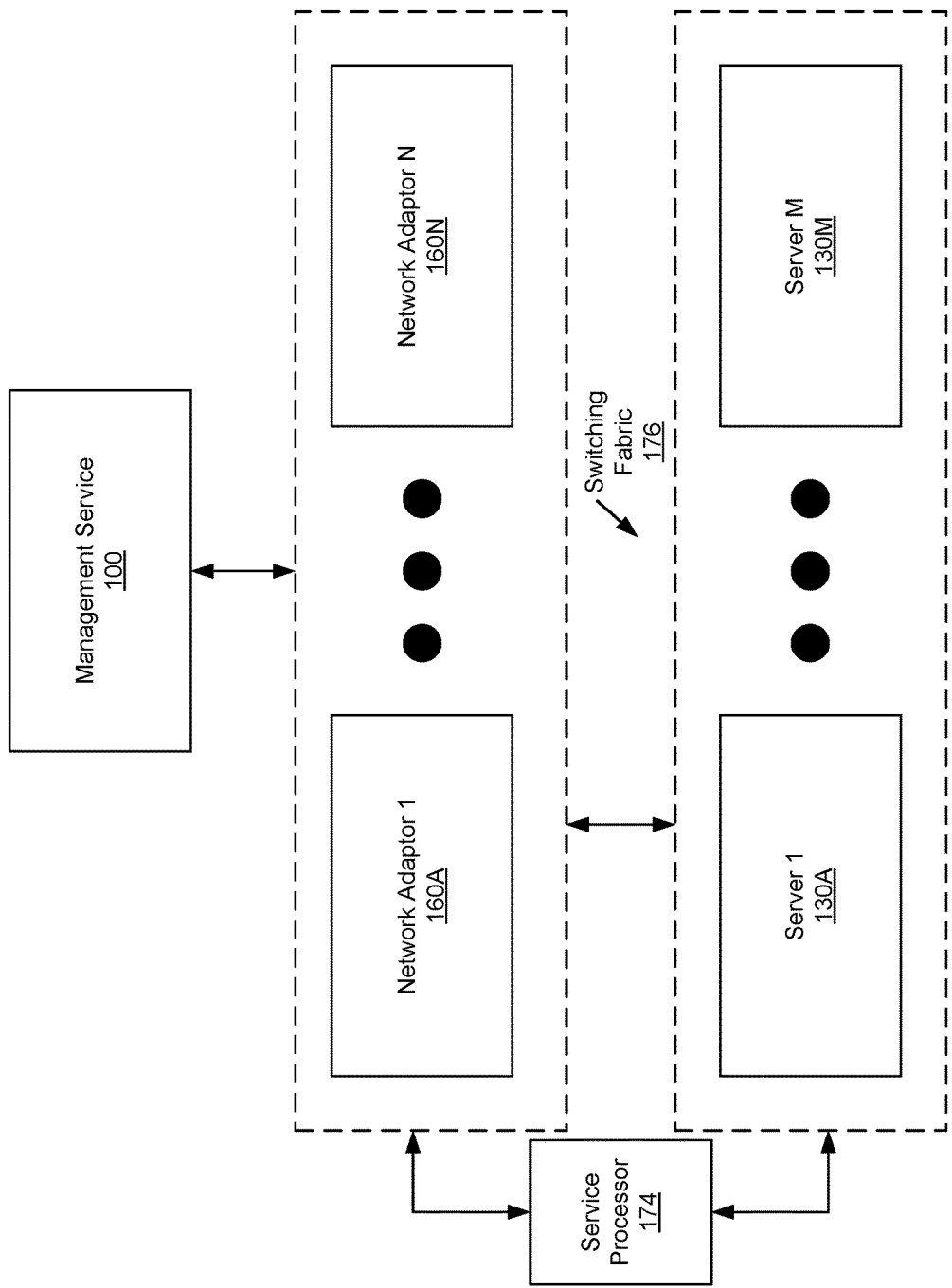
FIG. 3 shows a system in accordance with one or more embodiments of the invention.

FIG. 3 shows an alternate configuration of the system in accordance with one or more embodiments of the invention. In the system shown in FIG. 3, the servers (130A, 130M) and the network adapters (160A, 160N) are physically separate components as opposed to two components located within a single physical system (i.e., in computing device (120)). Further, instead of a 1:1 relationship between servers and network adapters, there may be n:1 relationship between servers and network adapters. In certain scenarios, a single server may be associated with multiple network adapters. The server(s) and the network adapter(s) may be connected via a switching fabric (176). The switching fabric (176) may directly connect the server(s) with the network adapter(s), or it may include network devices (e.g., routers and/or switches) that establish indirect connections between the server(s) and the network adapter(s). In one embodiment of the invention, a service processor (174) may be used to manage the interaction and/mapping between the servers and network adapters i.e., the service processor (174) may assign network adapters (160A-160N) to servers (130A-130N), for example, based on availability, bandwidth and redundancy considerations.

In one embodiment of the invention, the system described in FIGS. 1A-3 above may require configuration. More specifically, a computing device (120) may need to be configured by the management service (100). A computing device (120) may need to be configured, for example, when the computing device (120) is initially deployed, when an application is deployed on an existing computing device (120), when the computing device (120) boots or reboots, when software is updated, when user credentials are changed, or in any other situation where an element of the computing device's (120) configuration needs updating.

Figure 4:
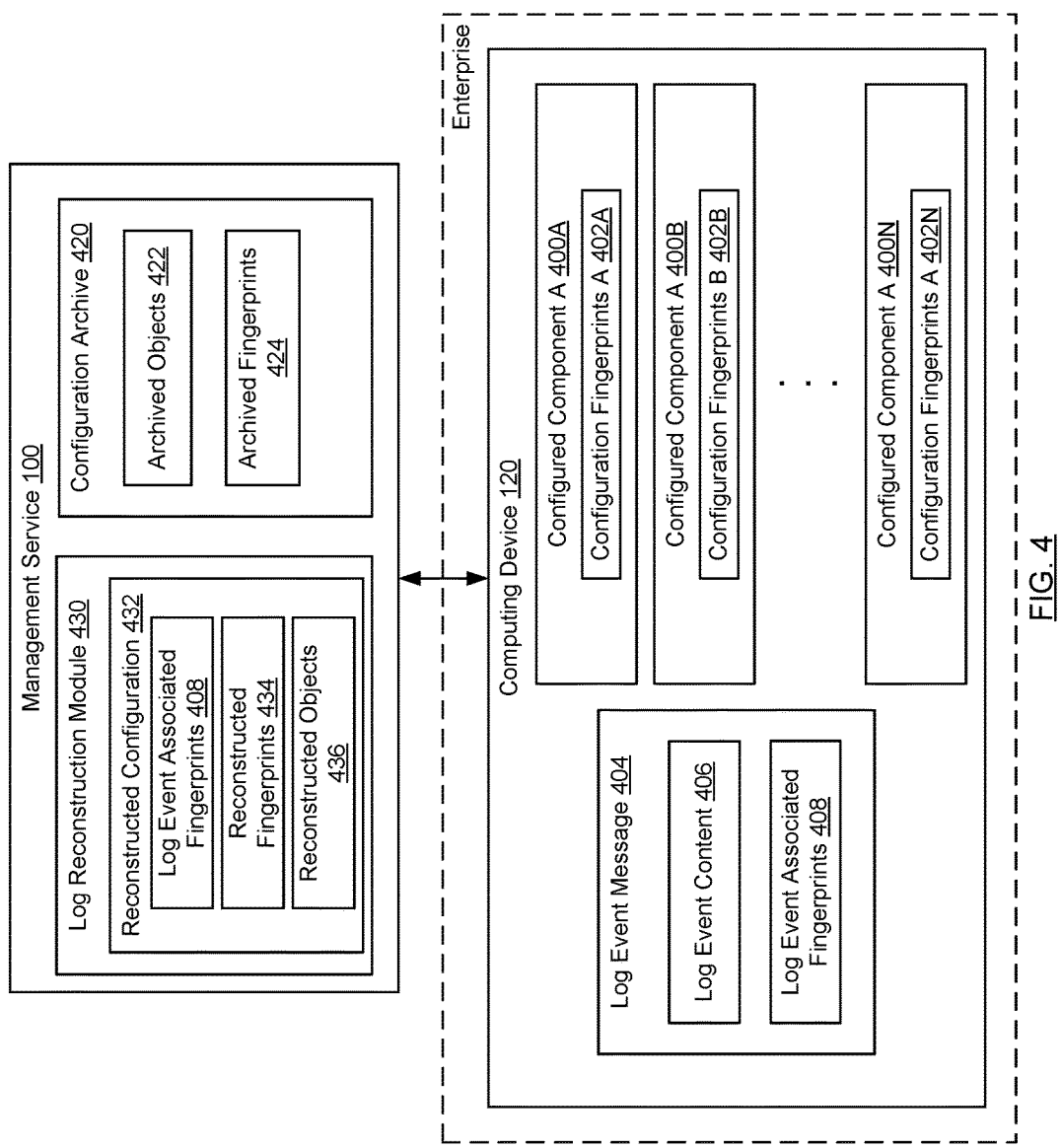
FIG. 4 shows a system in accordance with one or more embodiments of the invention.

FIG. 4 shows various components of the system previously described in FIGS. 1A-3 that may be used to log events generated by components of the computing device (120), in accordance with one or more embodiments of the invention. The other components of the system (while present) are omitted from FIG. 4 for purposes of clarity.

Turning to FIG. 4, in one or more embodiments of the invention, the management service (100) (described above) includes a log reconstruction module (430) that includes and/or has access to a configuration archive (420). Each of these components is described below.

The configuration archive (420), in accordance with one or more embodiments of the invention, stores a history of the configuration of the computing device (120). The computing device (120) may be configured remotely, e.g., when the management service (120) sends a configuration to the computing device. The history, stored in the configuration archive, may be updated each time a configuration is sent by the management service to the computing device, as further described below. The management service (100) may, for example, determine elements needed for a complete configuration of the computing device (120) and may subsequently provide these configuration elements to the computing device (120). In one or more embodiments of the invention, the management service (100) uses objects and fingerprints to configure the computing device, as further described below. Whenever the management service (100) sends an object and/or a fingerprint to the computing device, a copy of the object and/or the fingerprint (i.e., an archived object (422) and/or an archived fingerprint (424) is added to the configuration archive (420), in accordance with one or more embodiments of the invention. Fingerprints, in accordance with an embodiment of the invention, are globally unique. Each of the archived fingerprints (424) is therefore also globally unique, thereby allowing the identification of an archived fingerprint, with certainty. Archived objects (422) may be copies of objects used for specifying a configuration for a component of the computing device. Archived objects may further be copies of cache list objects, which are collections of fingerprints. Archived fingerprints (424) may be fingerprints of objects (object fingerprints) that may be used as identifiers for objects. Archived fingerprints may further be cache list pointers, which are fingerprints of cache list objects, thereby serving as identifiers for cache lists. Objects, object fingerprints, cache list objects and cache list pointers are described in detail below, with reference to FIGS. 5 and 6.

The configuration archive (420), in accordance with an embodiment of the invention, may be maintained in any persistent (non-volatile) storage. The storage may include any combination of the following: magnetic storage, optical storage, NAND Flash memory, NOR Flash memory, Magnetic RAM Memory (M-RAM), Spin Torque Magnetic RAM Memory (ST-MRAM), Phase Change Memory (PCM), memristive memory, or any other memory defined as a non-volatile Storage Class Memory (SCM). Those skilled in the art will appreciate that embodiments of the invention are not limited to aforementioned types of storage.

In one embodiment of the invention, the management service includes a log reconstruction module (430). The log reconstruction module may perform methods described below with reference to FIG. 8, in order to reconstruct configuration states of the computing device (120) from log event messages provided by the computing device. A log event message (404) may be provided by the computing device, for example, spontaneously when an error is detected on the computing device, or periodically to provide status information. The log event message (404), provided by the computing device, may include one or more fingerprints associated with the log event being communicated by the log event message. These log event associated fingerprints (408), further described below, identify the component(s) affiliated with the log event that triggered the sending of the log event message. Because the log event associated fingerprints (408) uniquely identifies a specific configuration(s) at a specific instant in time, these log event associated fingerprints (408) may enable disambiguation and reconstruction of configurations of the computing device at any point in time. The scope of the disambiguation and/or reconstruction may range from a single setting (e.g., an updated parameter) to configurations of entire computing devices, at any instant in time, including time intervals over which a configuration may have evolved. Log event associated fingerprints may thus allow the tracking of configuration changes or events in general, caused by either user actions, or triggered by occurrences of any type of internal or external events, as further described below.

Consider, for example, a scenario where a transmission error is detected by the network adapter (160) while receiving data from another device. In this scenario, the log event associated fingerprints (408) included in the log event message (404) may be the fingerprints used for configuring the network adapter and may further include fingerprints used for parameterizing the network protocol used during the receipt of the failed network transmission. Based on the received log event associated fingerprints (408), various configuration elements, valid at the time the log event was generated, may be reconstructed. These configuration elements may be represented by reconstructed objects (436) and identified by reconstructed fingerprints (434). Details about obtaining reconstructed objects (436) via reconstructed fingerprints (434) are provided below, with reference to FIG. 8. In one embodiment of the invention, the combination of log event associated fingerprints (408), reconstructed fingerprints (434) and reconstructed objects (436) may therefore establish a reconstructed configuration (432). The reconstructed configuration may enable an administrator to assess aspects of the configuration beyond the configuration elements directly related to the configuration elements associated with the log event associated fingerprints (408). This may be useful for example, in case of a malfunction. Not only aspects of the configuration that are directly related to the malfunctioning component, but also aspects of the configuration that are seemingly unrelated, but that may have indirectly caused or contributed to the malfunction, may be available for analysis.

Continuing the discussion of FIG. 4, in one or more embodiments of the invention, the computing device (120) includes configured components A-N (400A-400N). A configured component may be any of the previously described components of the computing device or another component of the computing device that requires configuration. A configured component may be, for example, an application sandbox, and application virtual machine, a service virtual machine, the hypervisor, a network adapter and individual elements of these components. Those skilled in the art will appreciate that the term "configured component" is not limited to the above examples. Any hardware component, software component or combination of software and hardware that is configurable, using the subsequently described method for configuring computing devices, may be a configured component. The configured components (400A-400N) may include configuration fingerprints (402A-402N). The configuration fingerprints may have been received from the management service. In one embodiment of the invention, the configuration fingerprints specify the configurations of the configured components, provided by the management service. The configuration of a computing device (120) using configuration fingerprints (402A-402N) is described below. In one embodiment of the invention, copies of the configuration fingerprints (402A-402N) are stored in the configuration archive (420) as archived fingerprints (424).

In one or more embodiments of the invention, the computing device (120) generates a log event message (404) upon occurrence of a log event, i.e., a trigger event that necessitates the generation of the log event message, as described below, with reference to FIG. 7. The log event message, generated by the computing device (404) may include log event content (406) and log event associated fingerprints (408). In one embodiment of the invention, the log event content (406) is information to be reported to the management service (100). The log event content may be, for example, a time stamp, an identity of a configured component, settings, protocol selections, periodically reported usage statistics, activity reports, or event triggered reports of errors, unexpected events, or events in general, and may include, for example, a core dump, the content of registers, conflict information, performance statistics, etc.

Those skilled in the art will appreciate that the invention is not limited to above described examples for log event content. A log event message may be generated either periodically or spontaneously to convey any type of information from a configured component (400A-400N) of the computing device (120) to the management service (100). The log event content (406) may include, but is not limited to, data critical for the secure and/or stable operation of the computing device, e.g., error messages, acknowledgements by configured components that configurations, specified by configuration fingerprints sent by the management service, have been applied, etc. Log event content may further include non-critical but informative content, e.g., status messages, usage statistics, etc. The log event content (406) may include other information without departing from the invention.

Log event associated fingerprints (408), in accordance with one embodiment of the invention, include a subset of the configuration fingerprints (402A-402N). In one embodiment of the invention, the log event associated fingerprints include fingerprints that are related to the log event. Consider the previously introduced example of a transmission error detected by the network adapter (160) of the computing device (120). Further, assume that the network adapter (160) is configured component A (400A). The log event associated fingerprints (408) may thus include configuration fingerprints A (402A). If the transmission error occurred in a user datagram protocol (UDP) transmission, one or more fingerprints related to the configuration of the UDP protocol may also be included in the log event associated fingerprints (408), whereas fingerprints related to the configuration of other protocols, e.g. the transmission control protocol (TCP), may not be included.

Figure 5:
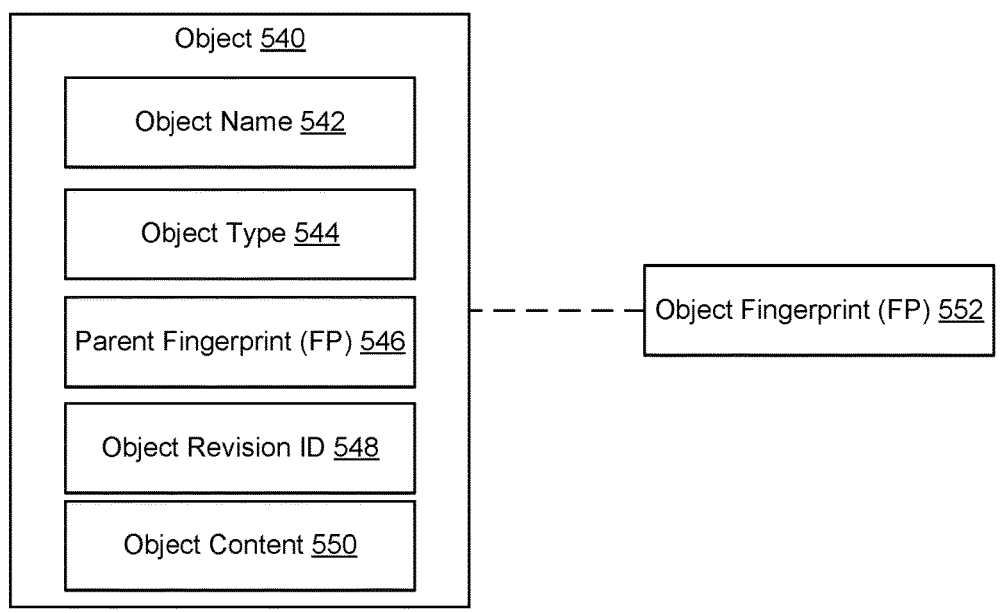
FIG. 5 shows a system in accordance with one or more embodiments of the invention.

Turning to FIG. 5, FIG. 5 shows an object (540) and a corresponding fingerprint (552) in accordance with one or more embodiments of the invention. In one embodiment of the invention, an object is a file that includes a set of machine-readable instructions used to convey configuration information, enabling, for example, the management service (100) to provide configuration instructions to the computing device (120). The use of objects for conveying configuration information is described below. The object may be stored in a format that is human readable. In one embodiment of the invention, a markup language, for example, the Java Script Object Notation (JSON) is used to store configuration information in an object (540). In one embodiment of the invention, an object includes multiple elements, including an object name (542), an object type (544), a parent fingerprint (546), an object revision ID (548), and an object content (550). The object name (542), the object type (544), the parent fingerprint (546), the object revision ID (548) and the object content (550) may be strings of characters and/or numbers of any length and/or complexity in the file that represents the object. Each of these strings may be delimited by specific identifiers, for example, by JSON object delimiters. In one embodiment of the invention, the object name (542) is a descriptive identifier of the object. In one embodiment of the invention, the object type (544) classifies the content and/or function of the object. Classifications may include, for example, entitlements (e.g., definition of privileges), images (e.g., software packages to be deployed), etc. In one embodiment of the invention, the parent fingerprint (546) is a cryptographic identifier of a parent object. Embedding a fingerprint of a parent object in the object enables the construction of tree-like hierarchies of objects, where objects depend from parent objects, thus enabling the communication of multiple configuration parameters in a structured manner. The use of fingerprints and object hierarchies for the purpose of communicating configuration parameters is described below. In one embodiment of the invention, the object revision ID (548) is an ID that is modified with each change made to the object, for example, when the parameter the object conveys is updated. In one embodiment of the invention, the object content (550) is the configuration data to be conveyed to the computing device to be configured. The object content (550) may be of any type, for example, it may be a parameter value, a credential, a software image to be deployed on a computing device, etc.

In one embodiment of the invention, a fingerprint (552) is cryptographic identifier affiliated with the object (540). A fingerprint may be any combination of characters and/or numbers that is globally unique to the object (540) with which it is affiliated and which it defines. In one embodiment of the invention, the fingerprint (552) affiliated with the object (540) is a hash (for example an SHA-1 or SHA-2 hash)) of the object (540). The fingerprint (552) may therefore need to be recomputed each time the object (540) changes. In one embodiment of the invention, a fingerprint may be used as an identifier for an object, as further described below.

Figure 6:
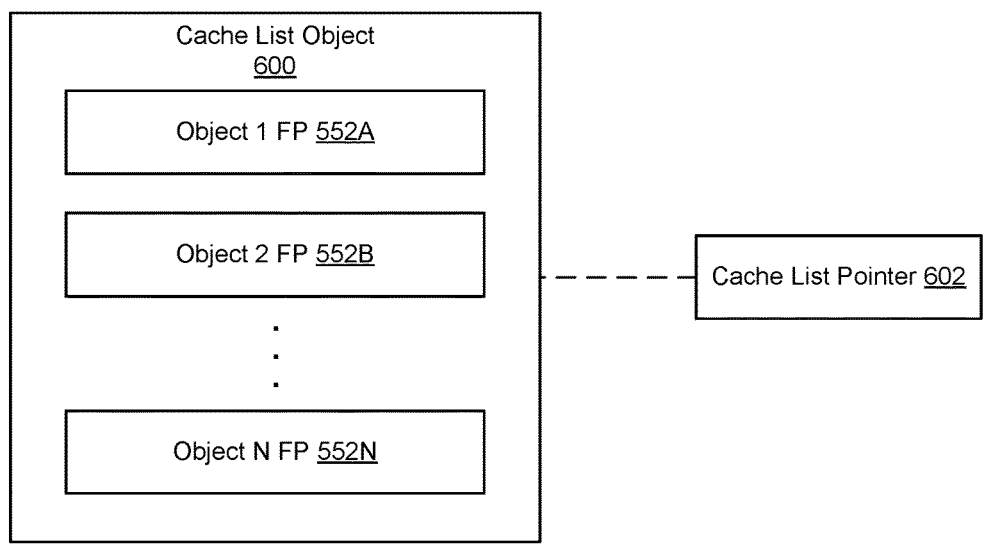
FIG. 6 shows a system in accordance with one or more embodiments of the invention.

Turning to FIG. 6, FIG. 6 shows a cache list object (600) and corresponding cache list pointer (602) in accordance with one or more embodiments of the invention. In one embodiment of the invention, a cache list object (600) is a collection of the fingerprints of objects that may be used to configure a computing device (120). In one embodiment of the invention, the cache list pointer (602) affiliated with the cache list object (600) is a fingerprint of the cache list object (600). In one embodiment of the invention, the cache list pointer (602) may be a hash (for example an SHA-1 or SHA-2 hash)) of the cache list object (600). In one embodiment of the invention, the cache list pointer (602) therefore is unique for the combination of all object fingerprints (552A, 552B, 552N) that are included in the cache list object (600). The cache list pointer (602) may therefore need to be recomputed each time any object (552), whose fingerprint is included in the cache list object (600), changes. The use of the cache list object (600) and the cache list pointer (602) are described below.

One skilled in the art will recognize that the architecture of a system is not limited to the components shown in FIGS. 1A-6. For example, the system may include multiple computing devices, a computing device may include multiple application sandboxes, an application sandbox may include multiple applications. Depending on the configuration of a computing device, the computing device may include different configured components. Further, many objects that may include different types of configuration information may be used to configure a computing device. In addition, each time a configuration changes, the objects, representing the aspects of the configuration information that are changing, may be updated. Accordingly, object fingerprints, the cache list object, and the cache list pointer may also change over time. In one or more embodiments of the invention, the objects and fingerprints, changing over time, are archived as archived objects and archived fingerprints, respectively, in the configuration archive.

Objects (540), object fingerprints (552A-552N), cache list objects (600) and cache list pointers (602), previously described with reference to FIGS. 5 and 6 may be used by the management service to configure a computing device. The configuration may be built by the management service, prior to configuring the computing device. Building the configuration may include identifying all configuration data items permitted to be applied to the configuration of the computing device. Next, the management service may generate objects (540), object fingerprints (552A-552N), a cache list object (600), and a cache list pointer (602) from the configuration data items. One object (540) may be generated for each configuration data item (e.g., a parameter, a credential, an image of an application, etc.). An object may be generated by encapsulating the configuration data item with the JSON framework used to define objects, as previously described with reference to FIG. 5. For example, the configuration data item, for which an object (540) is to be generated, may become the object content (550), delimited by the appropriate JSON identifiers. Further, an object name (542), an object type (544), a parent fingerprint (546), and an object revision ID (548) may be added, each delimited by the appropriate JSON identifiers, thus generating a complete object. Once the object (540) is generated, the fingerprint (552), affiliated with the object, may be computed. The fingerprint may be an SHA-1 or SHA-2 hash of the object (540). In one embodiment of the invention, the objects to be used for configuring the computing device (120) may be generated in a particular order. Because an object (540) includes the fingerprint of the parent object (546), parent objects may need to be generated before children, grandchildren, etc., may be generated.

In one embodiment of the invention, the integration of the parent fingerprint in an object hierarchically structures the objects in a tree-like structure (parent-pointer tree) where parent objects may have child objects, etc. For example, in a configuration used to deploy a software image on a computing device, the application instance intended to be executed on the computing device may be the parent of an image object, permissions, entitlements, etc.

In one embodiment of the invention, whenever an object changes, the object fingerprint needs to be recomputed. Due to the hierarchical object dependencies (as previously described, an object may include the fingerprint of the parent object), child objects (and their fingerprints), grandchild-objects (and their fingerprints), etc. change whenever a parent object (and the parent object's fingerprint) changes.

In one embodiment of the invention, once all objects that are part of a computing device's configuration and all associated fingerprints have been generated, all fingerprints (552A-552N) may be collected to be included in the cache list object (600). Subsequently, in accordance with one embodiment of the invention, the cache list pointer (602), i.e., the fingerprint affiliated with the cache list object (600) is computed. The cache list pointer may be an SHA-1 or SHA-2 hash of the cache list object. Because the cache list pointer is a hash obtained from all fingerprints of all objects of the configuration, the cache list pointer is a globally unique identifier for all configuration data included in the configuration. Accordingly, any change of any configuration detail may result in a different cache list pointer, and the cache list pointer may therefore need to be re-computed each time an object is updated, added or removed.

Next, the management service (100) may use the objects (540), the cache list object (600), and the cache list pointer (602) to configure the computing device (120). The management service (100) may send the cache list object (600) and the cache list pointer (602) to the computing device (120). On the computing device (120), the cache list object (600) and the cache list pointer (602) may be directed to a component to be configured, e.g., configured component A (400A). The configured components (e.g., configured component A (400A)) may thus receive configuration fingerprints (402), which may be object fingerprints (552A-552N), sent in a cache list object (600). The received configuration fingerprints (402) may specify configuration changes to be implemented by the configured component. The configuration of the configured component may be updated by first obtaining the objects (e.g. one or more objects (412)) corresponding to the configuration fingerprints (402), and then by applying the configuration, defined by the objects, to the configured component. The new configuration may immediately take effect, or it may be delayed, for example, if many configuration fingerprints are received by the computing device at once, resulting in a delay due to, the processing time required to process the received configuration fingerprints. The configured component may then begin to operate in accordance with the configuration specified by the objects. These steps may be repeated for any configuration change mandated by the management service. In one embodiment of the invention, for each configuration fingerprint (402A-402N) effecting a change to the configuration of a configured component (400A-400N), a copy of the fingerprint is stored as an archived fingerprint (424) in the configuration database. Further, a copy of the object associated with the archived fingerprint is stored as an archived object (422). Accordingly, a configuration fingerprint (402), returned by a configured component (400A-400N) as a log event associated fingerprint (408), included in a log event message, allows reconstruction of the configuration specified by the configuration fingerprint (402) by identifying, in the configuration database, an archived fingerprint (424), corresponding to the log event associated fingerprint (408), and by subsequently retrieving the configuration specified by the archived object (422), corresponding to the identified archived fingerprint (424). The details of the reconstruction of a configuration based on a log event message returned to the management service by the computing device are described in detail below, with reference to FIGS. 7 and 8.

Figure 7:
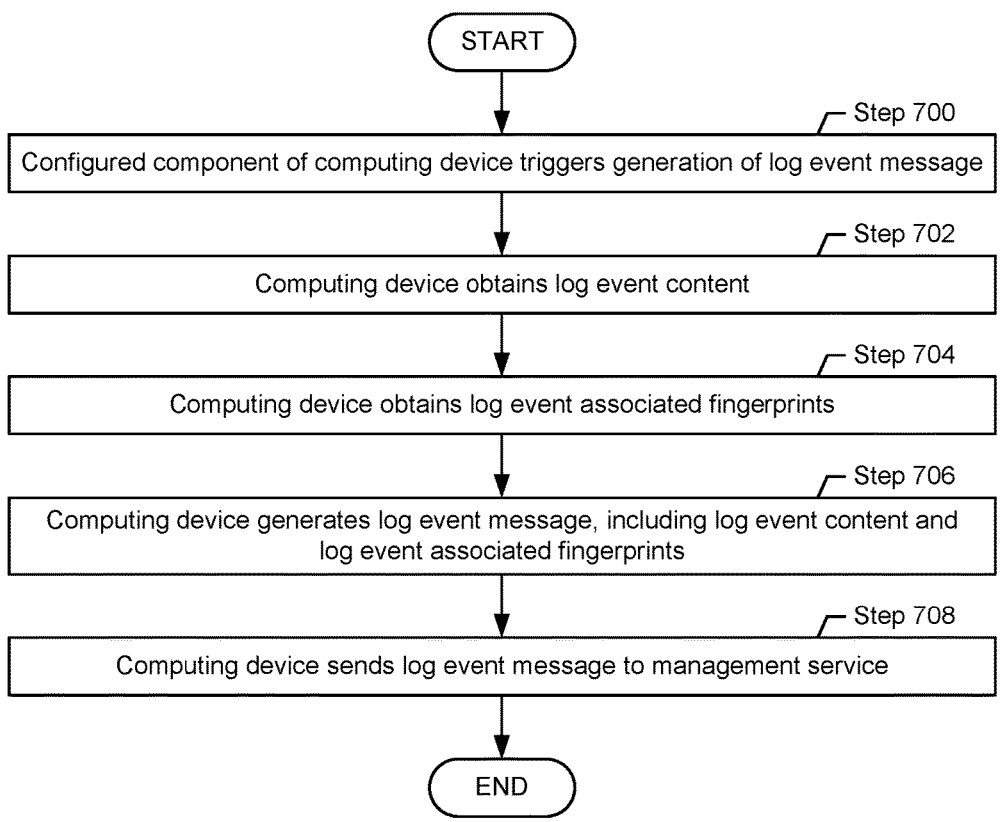
FIG. 7 shows a flowchart in accordance with one or more embodiments of the invention.
Figure 8:
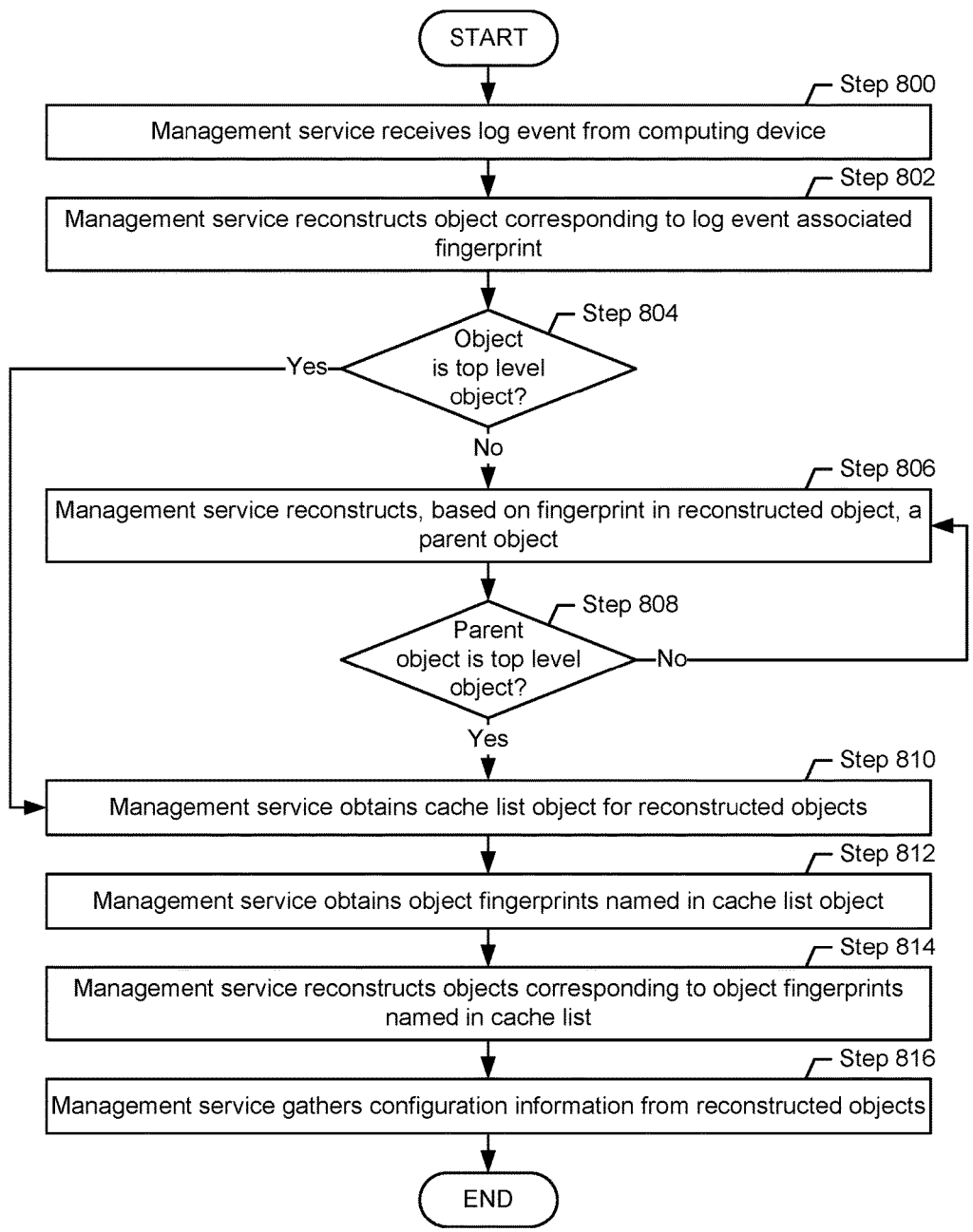
FIG. 8 shows a flowchart in accordance with one or more embodiments of the invention.

FIGS. 7 and 8 show flowcharts in accordance with one or more embodiments of the invention.

While the various steps in the flowcharts are presented and described sequentially, one of ordinary skill will appreciate that some or all of these steps may be executed in different orders, may be combined or omitted, and some or all of the steps may be executed in parallel. In one embodiment of the invention, the steps shown in FIGS. 7 and 8 may be performed in parallel with any other steps shown in FIGS. 7 and 8 without departing from the invention.

FIG. 7 shows a method for generating a log event message by a computing device, and for providing the log event message to the management service. In one embodiment of the invention, a log event message may be sent periodically. In an alternative embodiment of the invention, a log event message may be sent spontaneously. Periodically sent log event messages may, for example, include status updates provided by configured components of the computing system, and may be sent, for example at regular time intervals. Spontaneously sent log event messages may be triggered by a particular event, e.g., after completing the configuration of a configured components, as previously described, or when encountering an unexpected condition such as an error detected by a configured component. In one embodiment of the invention, the method described in FIG. 7 may be executed each time when a log event message is to be sent. The execution of the method described in FIG. 7 may be triggered by any configured component that encounters a condition requiring the sending of a log message to the management server.

Turning to FIG. 7, in Step 700, a computing device component triggers the generation of a log event message.

As noted above, a trigger event causing the generation of a log event message, i.e., a log event, may be a periodic event, such as a particular amount of time having elapsed, or it may be a spontaneous, i.e. non-scheduled, event. For example, the following spontaneously occurring events may cause the composition and the sending of log event messages:
  (i) Successful configuration of a configured component. More specifically, once completion of the configuration of the configured components is detected, a log event message may be sent to notify the management service of the completed configuration.
  (ii) Detection of a malfunction or potential malfunction of a configured component.
  (iii) Statistics including, for example:
    periodic flow statistics for new flows, completed flows and existing flows, etc.,
    DNS lookup events that may have succeeded, failed and/or may have been blocked by a policy,
    summaries of blocked traffic,
    entitled traffic statistics, including flows, HTTP traffic, file system access, FTP sessions, etc.,
    resource consumption of configured components.

Those skilled in the art will recognize that trigger events that may cause the composition and sending of log event messages are not limited to the above examples. Rather, any event that may be of relevance or interest to the management service and/or a system administrator may be considered a trigger event causing the generation and sending of a log event message.

In Step 702, the computing device obtains log event content to be included in the log event message. Log event content may be any type of information to be made available to the management service using the log event message. For example, in case of a successful configuration of a configured component being reported, the log event content may include a timestamp identifying the time when the configuration of a configured component was successfully completed. In case of an error, detected by a configured component, being reported, the log event may include an error message, a warning, a core dump, etc. In one embodiment of the invention, the log event content may be obtained from the configured component that has triggered the generation of the log event message.

In Step 704, the computing device obtains the fingerprint(s) associated with the log event. In one embodiment of the invention, log event associated fingerprints are identified based on their connection to the log event being reported by the log event message. For example, in case of a successful configuration of a configured component being reported, the fingerprint corresponding to the object that includes the configuration instructions that have been successfully applied may be the log event associated fingerprint. In case of an error, detected by a configured component, being reported, fingerprints of any configured component, related to the occurrence of the error, may be reported. Accordingly, fingerprints of multiple configured components may be considered log event associated fingerprints to be included in the log event message. Consider the previously introduced example of a transmission error detected by a network adapter of the computing device. The log event associated fingerprints may thus include the latest configuration fingerprints associated with a configuration applied of the network adapter. In addition, the log event associated fingerprints may also include the latest fingerprints associated with a network protocol being used for the transmission. If, for example, the transmission error occurred during a user datagram protocol (UDP) transmission, one or more fingerprints related to the configuration of the UDP protocol may also be included in the log event associated fingerprints (408), whereas fingerprints related to the configuration of other protocols, e.g. the transmission control protocol (TCP), may not be included.

In Step 706, the computing device generates the log event message. In one embodiment of the invention, generating the log event message includes combining the log event content, obtained in Step 702, and the log event associated fingerprints, obtained in Step 704, to form the log event message.

In Step 708, the log event message is sent to the management service. The log event message may be sent in encrypted form (e.g. using public-private key pair encryption) or it may be sent in unencrypted form. Further, the integrity of the transmission of the log event message may be protected, using, for example, a fingerprint such as a signed SHA-1 or SHA-2 hash of the log event message, accompanying the log event message. In one embodiment of the invention, the log event message is immediately sent to the management service. In an alternative embodiment, the sending of the log event message is delayed. The log event message may be sent, for example, at a time when network usage is low (e.g. at night), thus avoiding causing network congestion.

In one embodiment of the invention, one or more of the steps described with reference to FIG. 7 are performed by a logging framework, implemented on the computing device. The logging framework may accept unstructured text logs (e.g., logs similar to the Unix syslog format) and/or it may accept structured logs provided, e.g. as data structures. For structured logs, the configured component of the computing device, responsible for the generation of the log event message, may create the data structure that includes the log event content, and/or associated fingerprints. The logging framework may further have a notion of priorities and may therefore process and send higher priority log event messages to the management service, prior to sending lower priority log event messages.

FIG. 8 shows a method for reconstructing a configuration state of the computing device from the log event message received from the computing device. The method shown in FIG. 8 may be executed upon receipt of a log event message from the computing device. After execution of the method described in FIG. 8, a reconstructed configuration, providing details beyond the information provided by the log event message itself, may be available, for example, to be analyzed by a system administrator.

Turning to FIG. 8, in Step 800, the management service receives a log event message, send by the computing device in Step 708.

In Step 802, the management service reconstructs an object corresponding to the log event associated fingerprint included in the log event message, received in Step 800. In one embodiment of the invention, an object may be reconstructed as follows. First, the management service may identify an archived fingerprint, identical to the log event associated fingerprint included in the log event message. The identification may be performed, for example, by searching archived fingerprints stored in the configuration archive for an archived fingerprint matching the log event associated fingerprint. Subsequently, the management service may identify the archived object, associated with the identified archived fingerprint, and may retrieve the archived object. The retrieved archived object, in accordance with an embodiment of the invention, is the reconstructed object. In one embodiment of the invention, if multiple log event associated fingerprints are included in the log event message, Step 802 may be repeated for each log event associated fingerprint. The reconstructed object(s), in accordance with an embodiment of the invention, include(s) configuration information that may enable an administrator to assess the configuration of the configured component, defined by the object(s), as previously described. Accordingly, the retrieval of the object(s) in Step 802 may enable an administrator to assess the local configuration (i.e., the configuration of the configured component itself) at the time the communication event was generated. Subsequent execution Steps 804-816 further enable acquisition of non-local configuration information (i.e., configurations of other configured components of the computing device), which may result in the partial or complete reconstruction of the entire configuration of the computing device, as described below.

In Step 804, a determination is made about whether the reconstructed object is a top level object. As previously described with reference to FIG. 5, an object may have a parent object, specified in the object by the parent fingerprint. An object may not have a parent object if the object is a top level object in the hierarchical tree-like structure (parent-pointer tree) of objects. Such a top level object may not have a parent object and therefore may not include a fingerprint associated with a parent object. If the reconstructed object is not a top level object, the method may proceed to Step 806. If the reconstructed object is a top level object, the method may proceed to Step 810. If multiple objects were reconstructed in Step 802, the determination may be made separately for each reconstructed object.

In Step 806, the management service reconstructs the parent objects of the objects reconstructed in Step 802. In one embodiment of the invention, a parent object may be reconstructed as follows. First, the management service may identify an archived fingerprint, identical to the parent fingerprint included in the reconstructed object. The identification may be performed, for example, by searching the archived fingerprints stored in the configuration archive for an archived fingerprint matching the parent fingerprint. Subsequently, the management service may identify the archived object, associated with the identified archived fingerprint, and may retrieve the archived object. The retrieved archived object, in accordance with an embodiment of the invention, is the reconstructed parent object.

In Step 808, a determination is made about whether the reconstructed parent object is a top level object. The determination may be made separately for each reconstructed parent object, if multiple reconstructed parent objects exist, as a result of having received a log event message that included multiple log event associated fingerprints, in Step 800. If the reconstructed parent object is not a top level object, the method may return to Step 804, in order to identify, based on the parent fingerprint in the reconstructed parent object, a parent object of the reconstructed parent object (i.e., a grandparent object). Step 806 and 808 may be repeated until a determination is made that a reconstructed object is a top level object. If a determination is made that the reconstructed parent object is a top level object, the method may proceed to Step 810.

In Step 810, the management service obtains the cache list object for the identified objects. In one embodiment of the invention, the cache list object is obtained based on the current cache list pointer. The current cache list pointer may be included in the log event, received from the computing device. Alternatively, the management service may rely on the latest known cache list pointer. A computing device, in accordance with an embodiment of the invention, periodically transmits the most recent cache list pointer for a cache list that has been processed to the management service, and the management service may therefore rely on the latest known cache list pointer to identify the cache list object.

In Step 812, the management service obtains the object fingerprints, included in the cache list object. If multiple cache lists were found as a result of having received, then the object fingerprints associated with each cache list are obtained.

In Step 814, the management service reconstructs the objects corresponding to the object fingerprints obtained from the cache list object(s) in Step 812. In one embodiment of the invention, and the object may be reconstructed as follows. First, the management service may identify archived fingerprints, identical to the fingerprints included in the cache list object. The identification may be performed, for example, by searching archived fingerprints stored in the configuration archive for fingerprints matching the fingerprints matching the fingerprints in the cache list object. Subsequently, the management service may identify the archived objects, associated with the identified archived fingerprints, and may retrieve the archived objects. The retrieved archived objects, in accordance with an embodiment of the invention, are reconstructed objects. If multiple cache list objects were obtained in step 810, Step 814 may be executed separately for each cache list object.

In one embodiment of the invention, Step 814 enables reconstruction of objects that may not be reconstructible by performing Steps 802-808. While these steps may only reconstruct objects in an upward direction in the tree-like hierarchies of objects (i.e., from object to parent object, to grandparent object, etc.), the reconstruction of objects based on object fingerprints in the cache list object may include additional object (e.g., sibling objects, their child objects, etc.). Accordingly, an entire tree of hierarchically organized objects may be reconstructed.

In Step 816, the management service gathers object content from the objects reconstructed in Steps 802-814. As previously described with reference to FIGS. 5 and 6, objects may be used to configure the computing device. The object content may be the information used to configure the computing device. The management service may gather the object content of either all objects or of selected objects only. Other object elements, e.g., object names, object types, and object revisions may be gathered. These elements may facilitate the analysis and/or interpretation of the configuration information by an administrator and may therefore also be included in the configuration information, gathered by the management service. The totality of the gathered information may reflect the configuration of the computing device at the time an event caused the generation of the log event message on the computing device, and may further include additional information, useful for the interpretation of the configuration.

Those skilled in the art will recognize that the methods described with reference to FIG. 8 are not limited to the reconstruction of objects that reflect the current configuration of a computing device. Rather, reconstructions may be performed for any current or past configuration of the computing device, as long as the relevant objects and object fingerprints have been archived. For example, a past configuration may be either partially or fully reconstructed starting from a past archived cache list pointer. Multiple consecutive past configurations may be reconstructed to track the configuration of the computing device over time.

Figure 9B:
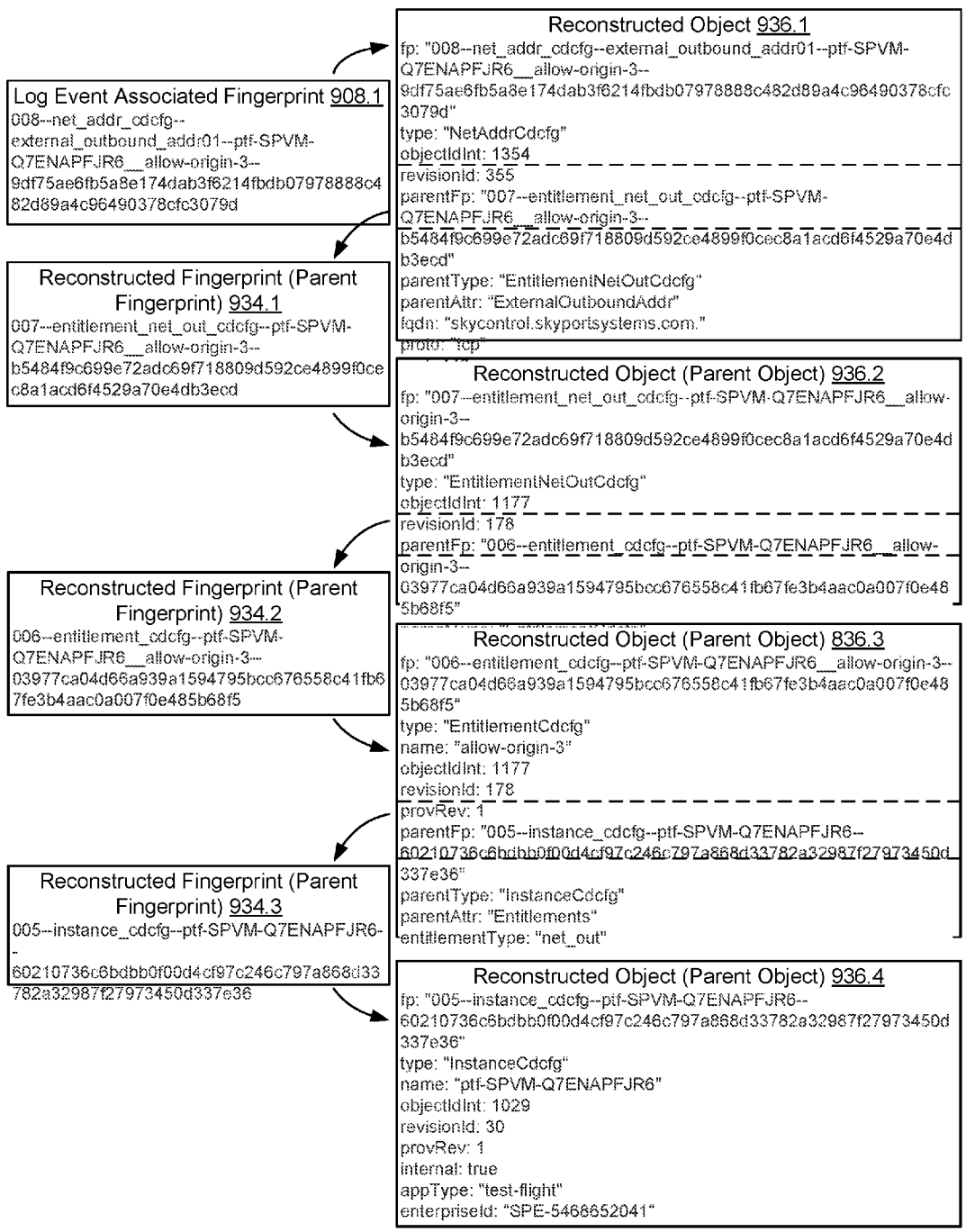

FIGS. 9A-9C show a use case scenario in which a log event message, sent by a computing device, is received by the management service. The log event message, shown in FIG. 9A, includes log event content (906) and log event associated fingerprints (908.1, 908.2). The use case scenario, described below with reference to FIGS. 9A-9C is intended to provide an example for the application of the method for logging events of computing devices, described in FIGS. 7 and 8. The use case scenarios are based on the system shown in FIG. 4. The use case scenarios are for illustrative purposes only. The methods described by FIGS. 7 and 8 are not limited to the use case scenario shown in FIGS. 9A-9C, but rather are universally applicable to a wide range of scenarios.

Consider a scenario in which the management service receives the log event message (904), shown in FIG. 9A. As described in FIG. 8, first, the log event associated fingerprints (908.1, 908.2) are identified in the log event message (904). Two log event associated fingerprints are identified. The subsequently performed steps are illustrated in FIG. 9B for the first detected log event associated fingerprint (908.1) and in FIG. 9C for the second detected log event associated fingerprint (908.2).

Referring to FIG. 9B, the log event associated fingerprint (908.1) is extracted from the log event message (904). An archived fingerprint, identical to the log event associated fingerprint is then identified from the archived fingerprints (424) in the configuration archive (420). Subsequently, the archived object, corresponding to the identified archived fingerprint is retrieved from a set of archived objects (422) in the configuration archive (420). The retrieved archived object is the reconstructed object (936.1).

Next, the parent fingerprint (delimited by pair of dashed lines in FIG. 9B) is extracted from reconstructed object (936.1), and an archived fingerprint, identical to the parent fingerprint is identified from the archived fingerprints (424) in the configuration archive (420). The identified archived fingerprint is the reconstructed fingerprint (934.1). Subsequently, the archived object, corresponding to the reconstructed fingerprint (934.1) is identified from the set of archived objects (422). The archived object is the reconstructed object (936.2).

The above steps are then repeated to obtain reconstructed fingerprints (934.2) and (934.3) and reconstructed objects (936.2)-(936.4). When reconstructed object (936.4) is examined for fingerprints, a determination is made that reconstructed object (936.4) does not include fingerprints. Reconstructed object (936.4) is therefore a top level object.

Referring to FIG. 9C, the log event associated fingerprint (908.2) is extracted from the log event message (904). An archived fingerprint, identical to the log event associated fingerprint is then identified from the archived fingerprints (424) in the configuration archive (420). Subsequently, the archived object, corresponding to the identified archived fingerprint is retrieved from a set of archived objects (422) in the configuration archive (420). The retrieved archived object is the reconstructed object (936.5). The reconstructed object is identical to the reconstructed object (936.4), reconstructed as previously described with reference to FIG. 9B. Because the reconstructed object (936.5) is a top level object, no further objects are reconstructed.

Subsequently, the configuration information is gathered from the reconstructed objects (936.1-936.5), and either all gathered configuration information or a selected subset of the gathered information may be presented to a system administrator. Additionally or alternatively, the reconstructed objects and/or gathered configuration information may be processed to contextualize event data, for example for analytics purposes and archiving.

Embodiments of the invention may enable a management service to reconstruct a configuration of a computing device based on a log event message provided by the computing device. The described methods are suitable for the reporting of periodic events and non-periodic, i.e. spontaneous, events.

In one embodiment of the invention, the configuration of a computing device may be reconstructed to various degrees, ranging from the reconstruction of the configuration of a configured component to the reconstruction of the entire configuration of the computing device. Further, in accordance with an embodiment of the invention, the reconstruction of the configuration may include the reconstruction of a configuration history, i.e., the reconstruction may allow an administrator to track how the configuration has evolved, eventually having led to having triggered the generation of the log event message. The reconstruction of past configurations may only limited by the extent that the configuration archive stores older archived objects and archived fingerprints.

While knowledge about a configuration of a computing device may also be derived directly from objects sent to the computing device when specifying the configuration, the configuration information obtained from these objects having been sent to the computing device way may be inaccurate, because there may be a non-negligible delay between the management service sending the objects specifying the configuration, and the computing device implementing the configuration, specified by the objects. An object specifying a configuration may therefore indicate a configuration that has not yet been implemented by the computing device. In contrast, analysis of the reconstructed configuration, in accordance with one or more embodiments of the invention, may enable the determination of the actual configuration, at the time an event has triggered the generation of a log event message, rather than a specified configuration.

In one or more embodiments availability of extensive, accurate configuration information enable extensive debugging of errors, the monitoring of compliance, threats and/or attacks. Methods in accordance with one or more embodiments of the invention may also be used in systems where the computing device is not accessible. Accordingly, embodiments of the invention may be suited to monitor unattended computing devices.

One or more embodiments of the invention are also suitable for use in environments where the bandwidth of the network connection between the computing device and the management service is limited. Unlike methods requiring core dumps of significant size, and/or frequent sending of status reports, embodiments of the invention only require the transmission of relatively compact log event messages at a relatively low frequency, e.g., only when a trigger event actually occurs. Further, the sending of the log event messages may be delayed to make use of time window where usage of the network connection bandwidth is low, e.g. at night.

Software instructions in the form of computer readable program code to perform embodiments of the technology may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that when executed by a processor(s), is configured to perform embodiments of the technology.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for logging events of computing devices, comprising:
    receiving, by a management service, a log event message from a computing device, wherein the log event message comprises a log event associated fingerprint;
    reconstructing, by the management service, an object corresponding to the log event associated fingerprint;
    reconstructing, by the management service, at least one parent object of the object corresponding to the log event associated fingerprint by:
        obtaining, from the object corresponding to the log event associated fingerprint, a first parent fingerprint that is stored in the object corresponding to the log event associated fingerprint,
        identifying a first archived fingerprint from a plurality of archived fingerprints to obtain an identified first archived fingerprint, wherein the identified first archived fingerprint is identical to the first parent fingerprint, and
        identifying a first archived object that is associated with the identified first archived fingerprint, wherein the identified first archived object is a first parent object of the at least one parent object;
    gathering, by the management service, configuration information from the object corresponding to the log event associated fingerprint, and from the at least one parent object;
    obtaining a second parent fingerprint from the first parent object;
    identifying a second archived fingerprint, identical to the second parent fingerprint obtained from the first parent object, from the plurality of archived fingerprints; and
    identifying a second archived object, associated with the identified second archived fingerprint, wherein the identified second archived object is a second parent object of the at least one parent object.

2. The method of claim 1, wherein the log event message further comprises log event content.

3. The method of claim 1, wherein the log event message is generated on the computing device, and wherein the generation of the log event message on the computing device comprises:
    obtaining log event content;
    obtaining the log event associated fingerprint;
    generating the log event message comprising the log event content and the log event associated fingerprint; and
    sending the log event message to the management service.

4. The method of claim 1, wherein reconstructing the object corresponding to the log event associated fingerprint comprises:
    identifying a third archived fingerprint, identical to the log event associated fingerprint, from the plurality of archived fingerprints; and
    identifying a third archived object, associated with the identified third archived fingerprint, wherein the identified third archived object is the object corresponding to the log event associated fingerprint.

5. The method of claim 1, further comprising making a determination that one of the at least one parent object is a top level object, and based on the determination:
    obtaining a cache list object that comprises the fingerprint of the one of the at least one parent object;
    obtaining from the cache list object, at least one additional fingerprint, wherein the at least one additional fingerprint, obtained from the cache list object, is different from the fingerprint of the one of the at least one parent object, and different from the log event associated fingerprint; and
    obtaining for the at least one additional fingerprint, obtained from the cache list object, at least one corresponding additional object.

6. A non-transitory computer readable medium comprising computer readable program code, which when executed by a computer processor enables the computer processor to:
    receive a log event message from a computing device, wherein the log event message comprises a log event associated fingerprint;
    reconstruct an object corresponding to the log event associated fingerprint;
    reconstruct at least one parent object of the object corresponding to the log event associated fingerprint by:
        obtaining, from the object corresponding to the log event associated fingerprint, a first parent fingerprint that is stored in the object corresponding to the log event associated fingerprint,
        identifying a first archived fingerprint from a plurality of archived fingerprints to obtain an identified first archived fingerprint, wherein the identified first archived fingerprint is identical to the first parent fingerprint, and
        identifying a first archived object that is associated with the identified first archived fingerprint, wherein the identified first archived object is a first parent object of the at least one parent object;
    gather configuration information from the object corresponding to the log event associated fingerprint, and from the at least one parent object;
    obtain a parent fingerprint from the first parent object;
    identify a second archived fingerprint, identical to the parent fingerprint obtained from the first parent object, from the plurality of archived fingerprints; and
    identify a second archived object, associated with the identified archived fingerprint, wherein the identified second archived object is a second parent object of the at least one parent object.

7. The non-transitory computer readable medium of claim 6, wherein the log event message further comprises log event content.

8. The non-transitory computer readable medium of claim 6, wherein the log event message is generated on the computing device, and wherein the computer readable code for generating the log event message on the computing device comprises instructions which when executed by the computer processor enable the computer processor to:
    obtain log event content;
    obtain the log event associated fingerprint;
    generate the log event message comprising the log event content and the log event associated fingerprint; and
    send the log event message to a management service.

9. The non-transitory computer readable medium of claim 6, wherein the computer readable code for reconstructing the object corresponding to the log event associated fingerprint comprises instructions which when executed by the computer processor enable the computer processor to:

identify a third archived fingerprint, identical to the log event associated fingerprint, from the plurality of archived fingerprints; and identify a third archived object, associated with the identified third archived fingerprint, wherein the identified the archived object is the object corresponding to the log event associated fingerprint.

10. The non-transitory computer readable medium of claim 6, wherein the computer readable program code, when executed by the computer processor, further enables the computer processor to make a determination that one of the at least one parent object is a top level object, and based on the determination:

obtain a cache list object that comprises the fingerprint of the one of the at least one parent object;

obtain from the cache list object, at least one additional fingerprint, wherein the at least one additional fingerprint, obtained from the cache list object, is different from the fingerprint of the one of the at least one parent object, and different from the log event associated fingerprint; and obtain for the at least one additional fingerprint, obtained from the cache list object, at least one corresponding additional object.

11. A computing device, comprising:

a server comprising a processor and a non-transitory computer readable medium comprising computer readable program code implementing a management service, which when executed by the processor enables the server to:

receive, by the management service, a log event message from a second computing device, wherein the log event message comprises a log event associated fingerprint;

reconstruct, by the management service, an object corresponding to the log event associated fingerprint;

reconstruct, by the management service, at least one parent object of the object corresponding to the log event associated fingerprint by:

obtaining, from the object corresponding to the log event associated fingerprint, a first parent fingerprint that is stored in the object corresponding to the log event associated fingerprint, identifying a first archived fingerprint from a plurality of archived fingerprints to obtain an identified first archived fingerprint, wherein the identified first archived fingerprint is identical to the first parent fingerprint, and identifying a first archived object that is associated with the identified first archived fingerprint, wherein the identified first archived object is a first parent object of the at least one parent object;

gather, by the management service, configuration information from the object corresponding to the log event associated fingerprint, and from the at least one parent object, obtain a parent fingerprint from the first parent object, identify a second archived fingerprint, identical to the parent fingerprint obtained from the first parent object, from a plurality of archived fingerprints, and identify a second archived object, associated with the identified archived fingerprint, wherein the identified second archived object is a second parent object of the at least one parent object.

12. The computing device of claim 11, wherein the log event message is generated on the second computing device, and wherein the generation of the log event message on the second computing device comprises:

obtaining log event content;

obtaining the log event associated fingerprint;

generating the log event message comprising the log event content and the log event associated fingerprint; and sending the log event message to the management service.

13. The computing device of claim 11, wherein the computer readable program code for reconstructing the object corresponding to the log event associated fingerprint comprises instructions which when executed by the processor enable the processor to:

identify a third archived fingerprint, identical to the log event associated fingerprint, from the plurality of archived fingerprints; and identify a third archived object, associated with the identified third archived fingerprint, wherein the identified third archived object is the object corresponding to the log event associated fingerprint.

14. The computing device of claim 11, further comprising computer readable program code, which when executed by the processor enables the processor to make a determination that one of the at least one parent object is a top level object, and based on the determination:

obtain a cache list object that comprises the fingerprint of the one of the at least one parent object;

obtain from the cache list object, at least one additional fingerprint, wherein the at least one additional fingerprint, obtained from the cache list object, is different from the fingerprint of the one of the at least one parent object, and different from the log event associated fingerprint; and obtain for the at least one additional fingerprint, obtained from the cache list object, at least one corresponding additional object.

* * * * *